Patented Nov. 10, 1936

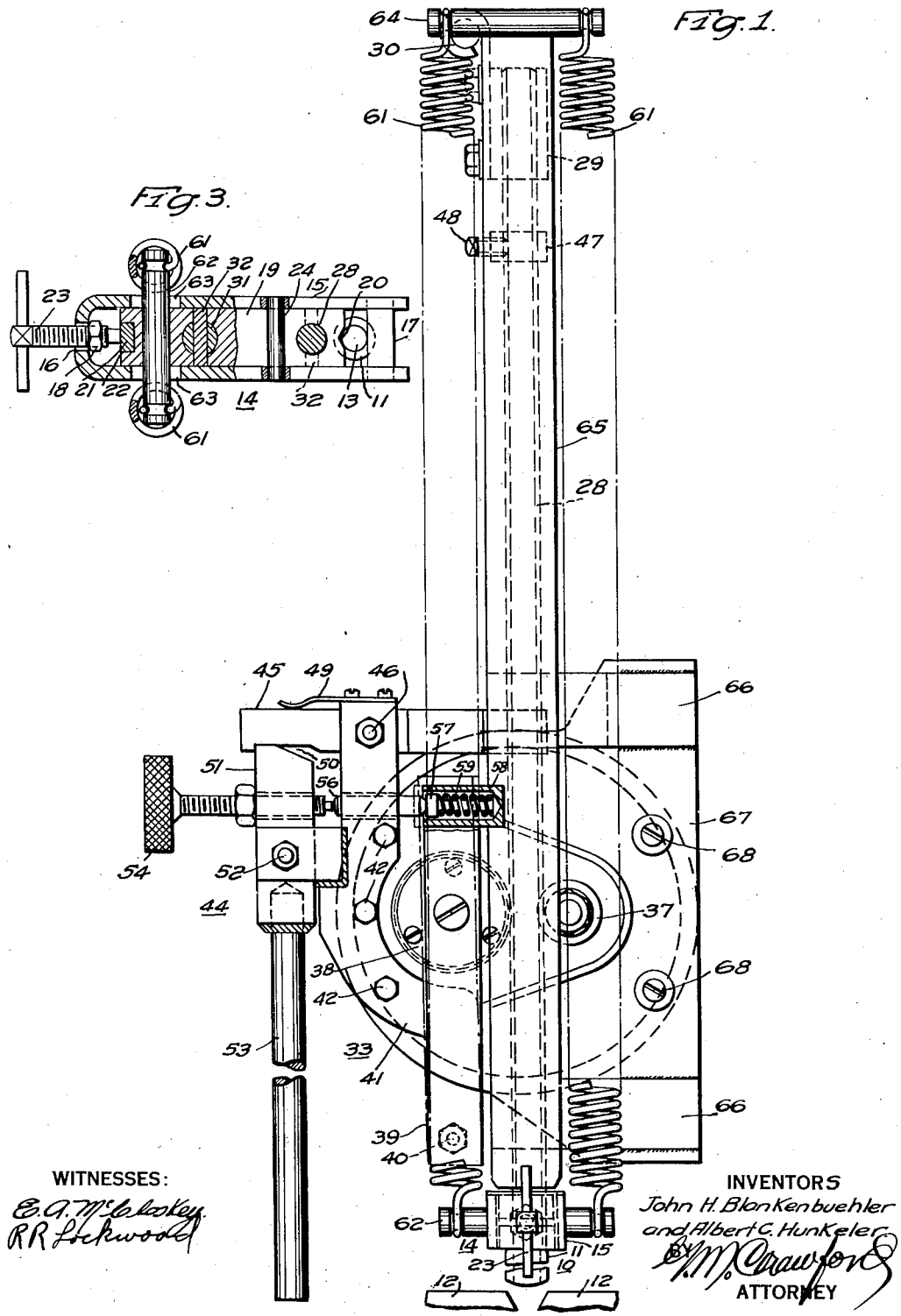

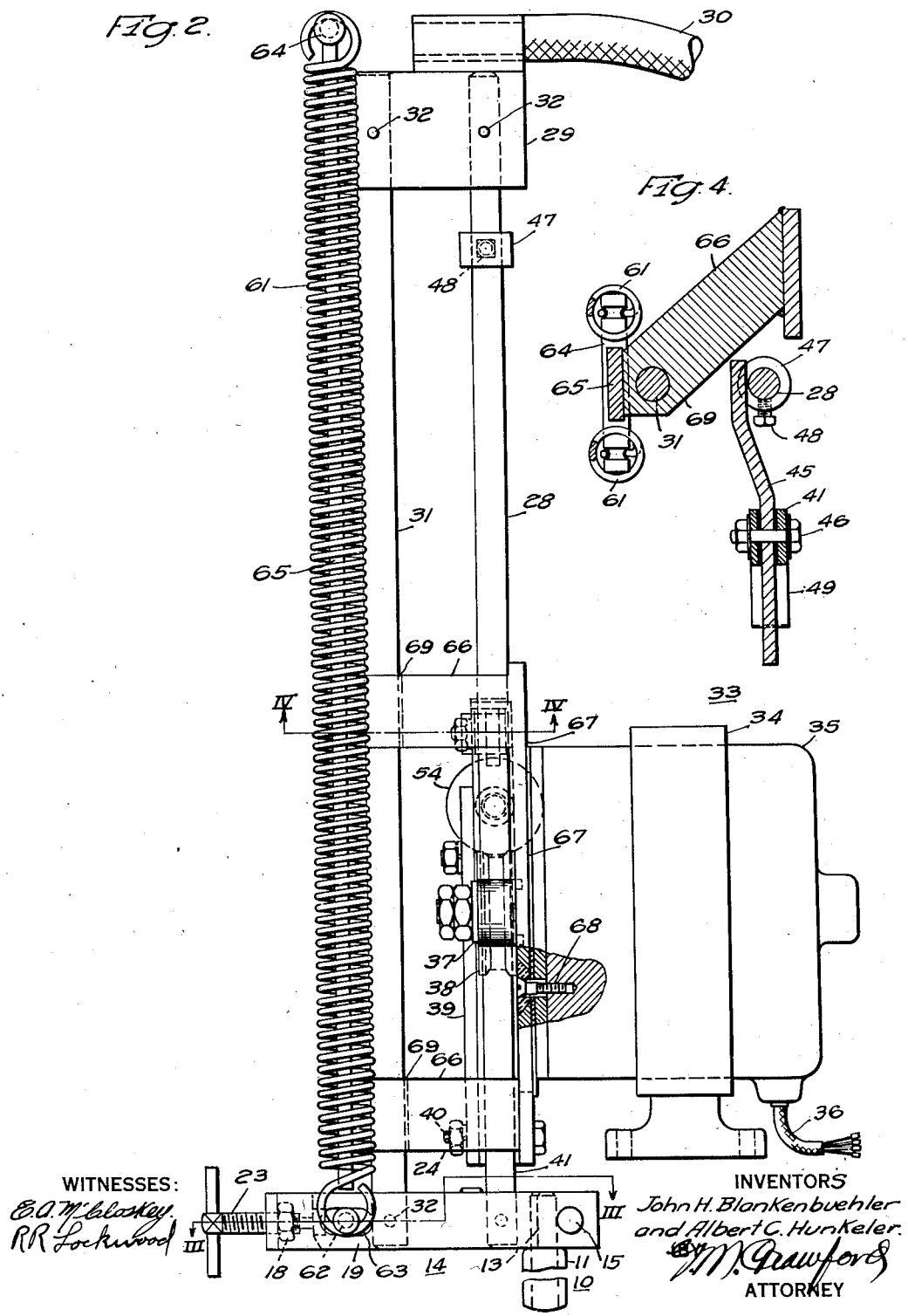

2,060,489

UNITED STATES PATENT OFFICE 2,060,489

WELDING APPARATUS

John H. Blankenbuehler, Swissvale, and Albert C. Hunkeler, Wilkinsburg, Pa., assignors to Westinghouse Electric and Manufacturing Company, a corporation of Pennsylvania Application April 12, 1932, Serial No. 604,676

5 Claims. (Cl. 219—8)

Our invention relates, generally, to welding apparatus, and, more particularly, to apparatus for feeding short lengths of welding electrodes to perform an arc welding operation.

In arc welding, it has been found that metallic welding electrodes which have been covered with a relatively thick coating of flux produce welds having highly desirable characteristics. Since the usual form of the flux is such that it will readily crumble and fall off from the electrodes if they are bent, it is desirable to manufacture and use the heavily fluxed electrodes in short lengths. Further, since the flux usually used is a non-conductor of electricity, it is desirable that some means be provided for connecting the metallic core of the coated welding electrode to the welding circuit in order that welding current may be readily conducted thereto.

Accordingly, the object of our invention, generally stated, is the provision of a welding electrode feeding device which shall be simple and efficient in operation and readily and economically manufactured and installed.

A more specific object of our invention is the provision of an electrode feeding attachment for use in connection with a welding head wherein the welding electrode is clamped and fed a predetermined distance and the clamping means is thereupon automatically retrieved.

It is also an object of our invention to provide for clamping and conducting current to a heavily fluxed welding electrode.

Other objects of our invention will, in part, be obvious and, in part, appear hereinafter.

Our invention, accordingly, is disclosed in the embodiment hereof shown in the accompanying drawings, and comprises the features of construction, combination of elements and arrangements of parts which will be exemplified in the construction hereinafter set forth, and the scope of the application of which will be indicated in the appended claims.

For a more complete understanding of the nature and scope of our invention, reference may be had to the following detailed description taken in connection with the accompanying drawings, in which Figure 1 is a view, in front elevation, of an electrode feeding attachment constructed in accordance with this invention, certain parts being broken away to more clearly disclose the invention;

Fig. 2 is a view, in side elevation, of the feeding attachment shown in Fig. 1, certain parts here also being broken away to more clearly disclose the invention;

Fig. 3 is a sectional view taken along the line III—III of Fig. 2 showing in more detail the electrode clamping means; and Fig. 4 is a sectional view taken along the line IV—IV of Fig. 2 showing more clearly the arrangement of the tripping mechanism with respect to the feed rod.

Referring now to the drawings, 10 designates generally a welding electrode provided with a heavy flux coating 11. The electrode 10 is fed to perform a welding operation along the joint between work pieces 12, as will be hereinafter set forth. In order to conduct welding current to the electrode 10, one end thereof is bared, as at 13, and is positioned in a clamp, shown generally at 14.

The clamp 14, as is more clearly shown in Fig. 3, comprises a U-shaped clamping member 15 which is provided with a threaded opening 16 in the closed end and a pin 17 which serves to close the open end, as illustrated. While the threaded opening 16 is formed by the use of a nut 18 welded to the inner side of the clamping member 15 as shown in this embodiment of the invention, it will be readily apparent that the clamping member 15 itself may be provided with a threaded opening, thereby avoiding the use of the nut 18.

A connector block 19, preferably comprising copper or some other material of high electrical conductivity, is slidably positioned within the clamping member 15 and is provided at one end with a transversely-extending V-shaped notch 20 and at the other end with a hardened insert 21 positioned within a suitable recess 22. In order to adjust the position of the connector block 19 with respect to the clamping member 15, an adjusting screw 23 is provided in the threaded opening 16 with one end bearing on the insert 21, as illustrated. A retaining member 24 is welded across the arms of the clamping member 15 to prevent it from turning about the connector block 19.

The bared end 13 of the electrode 10 is positioned in the V-shaped notch 20 of the copper connector block 19 and the adjusting screw 23 is turned until the pin 17 is engaged and the electrode 10 is securely clamped therebetween.

While in this embodiment of the invention a hardened insert 21 is described as being provided in the copper connector block 19 to prevent excessive wear and the pin 17 is described as being provided for closing the open end of the clamping member 15, it will be readily apparent that any other structure, such as a ball and socket joint, may be used in conjunction with the adjusting screw 23 to prevent excessive wear and that any other suitable means may be used for effecting the closure of the open end of the clamping member 15.

With a view to supporting the clamp 14 and for the purpose of permitting it to move downwardly as the electrode 10 is consumed, a feed rod 28 is secured to the connector block 19. The upper end of the feed rod 28 terminates in a second connector block 29 to which a suitable conductor 30 may be secured in order to connect the block 29 to one terminal of a welding generator.

The feed rod 28 is preferably constructed of steel or some other equally hard material for a purpose which will hereinafter be apparent and, therefore, a connector rod 31 is provided of copper or the like for connecting the connector blocks 19 and 29 together through a path of low electrical resistance. The feed rod 28 and the copper connecting rod 31 are secured in suitable openings in the connector blocks 19 and 29 by means of pins or rivets 32.

The movement of the feed rod 28 may be controlled by means of a welding head, shown generally at 33, which comprises a suitable frame 34 and a motor 35 of conventional design. In this specification, the frame 34 and the motor 35 will be referred to, generally, as the welding head 33 on which the electrode feeding attachment is mounted.

In order to connect the motor 35 to a current source, conductors 36 are provided. Since any motor of suitable construction and control apparatus therefor of well known design may be used in practicing our invention, a detailed description thereof is omitted from this specification.

Driving connection between the feed rod 28 and the welding head 33 is provided through the agency of a knurled feed roller 37, which may be connected through suitable gearing (not shown) to the shaft of motor 35. In order to cause driving engagement between the feed rod 28 and the feed roller 37, an idler roller 38 is mounted on the welding head 33 on the opposite side of the feed rod 28 from that on which the feed roller 37 is located. The idler roller 38 is supported by means of a bracket 39 which is pivoted at 40 in a bracket 41; the bracket 41 being secured by means of bolts 42 to the welding head 33.

The position of the idler roller 38 and thereby the driving engagement between the feed rod 28 and the feed roller 37 is controlled by means of a trip or reset mechanism, shown generally at 44. The trip or reset mechanism 44 comprises a trip arm 45 pivoted at 46 in the bracket 41 one end of which extends into the path of a trip ring 47 which is carried by the feed rod 28. The trip ring 47 is slidable along the feed rod 28 and may be secured in any desired position by means of a set screw 48.

The trip arm 45 is biased in a counter-clockwise direction by means of a leaf spring 49 which is secured to the upper end of the bracket 41.

The underside of the trip arm 45 is provided with a notch 50 with which the upper end of a reset lever 51 is disposed to engage, as shown. The reset lever 51 is pivoted at 52 on the bracket 41 and is provided with a handle 53 whereby the reset operation may be manually performed. An adjusting screw 54 is carried by the reset lever 51 in a suitable threaded opening and it is so positioned as to bear on a pin 56 which is slidably mounted in the bracket 41.

The pin 56 is disposed to engage a button 57 which is slidably positioned within a casing 58. The casing 58 is secured to the upper end of the idler roller support bracket 39 and the button 57 is prevented from coming out of the casing 58 by peening its edges at the open end, as illustrated. A spring 59 is provided in the casing 58 between the button 57 and the opposite end, thereby providing a certain degree of flexibility in the positioning of the idler roller 38.

After the clamp 14 and the welding electrode 10 have been fed downwardly and the latter has been fused a predetermined amount, it is desirable to retrieve the clamp 14, the feed rod 28 and the connector rod 31, when the driving engagement between the feed rod 28 and the feed roller 37 has been released, to permit the feeding of a new electrode. This desired retrieving action is accomplished through the use of two extensible coil springs 61 which are connected to the clamp 14 by means of a pin 62 secured in the lower connector block 19 and extending through slotted openings 63 in the U-shaped clamping member 15, as illustrated.

The upper ends of the coil springs 61 are connected to a second pin 64 which is carried by a support strap 65 that is mounted parallel to the feed rod 28 and the connector rod 31. The support strap 65 is welded to lugs 66 which, in turn, are welded to a support bracket 67. The support bracket is secured to the welding head 33 by means of screws 68.

As is more clearly illustrated in Fig. 4, the lugs 66 are each provided with an opening 69 through which the connector rod 31 is guided, thereby insuring that the movable parts of the feeding attachment will be maintained in alignment.

It will be observed that the lower end of the support strap 65 extends downwardly, past the welding head 33. This extension is provided to serve as a stop for the clamp 14 and, under operating conditions when the feeding attachment is in the full retrieved position, the lower end of the strap 65 will be in engagement with the upper side of the clamp 14.

While the feeding attachment has been described as being mounted directly on the welding head 33, it will be readily apparent that it is only necessary to mount it in fixed relation thereto with the feed rod 28 arranged in driving engagement with the feed roller 37 together with suitable means for releasing the driving engagement after a predetermined feeding operation and that it is not necessary to mount it directly on the welding head.

In operation, the bared end 13 of a welding electrode 10 is inserted in the clamp 14 and secured therein by the turning of the adjusting screw 23, as described hereinbefore. The handle 53 is rotated in a clockwise direction, thereby rotating the reset lever 51 in the same direction, compressing the spring 59 and moving the idler roller 38 into engagement with the feed rod 28. This movement of the reset lever 51 is continued until the upper end is latched in the notch 50 of the trip lever 45. By this operation, the feed rod has been moved into driving engagement with the feed roller 37.

It will be observed that the frictional engagement between the feed rod 28 and the feed roller 37 may be varied by means of the adjusting screw 54. Since the feed roller 37 is knurled, the frictional engagement need not be relatively great, thereby decreasing the power demand on the welding head 33 for performing the feeding operation.

The motor 35 is then energized and the feed rod 28, connector block 29, conductor 30, connector rod 31, clamp 14 and the welding electrode 10 are all downwardly fed until the welding electrode 10 has been consumed an amount which is determined by the position of the trip ring 47 on the feed rod 28. At the same time that the downward movement is going on, the springs 61 are being extended, thereby providing them with a certain amount of potential energy.

When the feeding movement has progressed to the point where the trip ring 47 engages the trip arm 45, a further movement will cause the idler roller support bracket 39 to be moved to the dotted position. This movement of the bracket 33 is caused when the trip arm 45 is rotated to release the reset lever 51, thereby causing the idler roller 38 to be disengaged from the feed rod 28 and at the same time releasing the driving engagement between the feed rod 28 and the feed roller 37. The potential energy which has been produced in the springs 61 is then released and the clamp 14 and its associated moving parts are automatically retrieved, whereupon the fused electrode may be removed, a new one inserted, and the above-described operation repeated as desired.

Since certain further changes may be made in the above construction and different embodiments of the invention may be made without departing from the scope thereof, it is intended that all matter contained in the above description or shown in the accompanying drawings shall be interpreted as illustrative and not in a limiting sense.

We claim as our invention:

1. An attachment for use with a welding head for feeding short lengths of welding electrodes to perform a welding operation comprising, in combination, support means mounted in fixed relation to the welding head, feeding means for carrying a welding electrode, the feeding means being guided in the support means and having driving connection with the welding head, biasing means mounted in fixed relation to the welding head to control the driving engagement between the feeding means and the welding head, a trip arm disposed to be operatively connected to said biasing means, and trip means carried by the feeding means for engaging said trip arm, thereby releasing the driving connection between the feeding means and the welding head.

2. An attachment for use with a welding head for feeding short lengths of welding electrodes to perform a welding operation comprising, in combination, support means mounted in fixed relation to the welding head, feeding means for carrying a welding electrode, the feeding means being guided in the support means and having driving connection with the welding head, biasing means mounted in fixed relation to the welding head to control the driving engagement between the feeding means and the welding head, trip means carried by the feeding means for tripping the biasing means and thereby releasing the driving connection between the feeding means and the welding head, and retracting means disposed to function on operation of said trip means for automatically retrieving the feeding means when the electrode has been fused a predetermined amount.

3. An attachment for use with a welding head for feeding short lengths of welding electrodes to perform a welding operation comprising, in combination, support means mounted in fixed relation to the welding head, feeding means for carrying a welding electrode, the feeding means being guided in the support means and having driving connection with the welding head, biasing means mounted in fixed relation to the welding head to control the driving engagement between the feeding means and the welding head, trip means carried by the feeding means for tripping the biasing means and thereby releasing the driving connection between the feeding means and the welding head, and resilient retracting means secured in fixed relation to the welding head and connected to the feeding means and extensible as the feeding means is fed and disposed to function on operation of said trip means to automatically retrieve the feeding means after having been fed a predetermined distance.

4. In arc welding apparatus, in combination, a welding head, a feed rod guided on the welding head, a feed roller and an idler roller disposed on opposite sides of the feed rod, the axis of rotation of the feed roller being fixed, the idler roller being movable into and out of engagement with the feed rod, driving means for the feed roller, reset means operatively connected to the idler roller for urging it into engagement with the feed rod and the feed rod into driving engagement with the feed roller, trip means carried by the feed rod for engaging the reset means to release the driving engagement between the feed rod and feed roller, and resilient means connected to the welding head and to the feed rod and extensible as the feed rod is fed for retrieving the feed rod after the reset means is tripped.

5. Means for feeding short lengths of welding electrodes comprising, in combination, a welding head, a motor carried by the welding head, means for connecting the motor to a current source, a feed roller mounted on the welding head and having driving connection with the motor, an idler roller disposed in cooperative relation with the feed roller, a support for the idler roller pivotally mounted on the welding head, a spring pressed plunger slidably disposed at the upper end of the idler roller support, a support strap secured to the welding head and extending upwardly therefrom, a feed rod disposed between the feed roller and the idler roller, a connector block secured to the upper end of the feed rod to provide for connecting one terminal of a welding circuit thereto, a second connector block secured to the lower end of the feed rod, a connecting rod comprising material of low electrical resistance connected between the connector blocks and extending parallel to the feed rod, a U-shaped clamping member slidably disposed around the lower connector block, a pin extending across the open and of the clamping member, an adjusting screw disposed in a threaded opening in the closed end of the clamping member for causing relative movement of the clamping member with respect to the second connector block to clamp a welding electrode between the connector block and the pin, holding and tripping means for the idler roller support comprising a trip ring secured to the feed rod, a trip lever pivotally mounted on the welding head, one end of the trip lever extending into the path of the trip ring and the other end provided with a notch on its under side, resilient means for biasing the trip lever to a predetermined position, a reset lever pivotally mounted on the welding head and provided with a projection for engaging the notch in the trip lever, a pin slidably carried by the welding head and disposed to engage the spring-pressed plunger of the idler roller support, an adjusting screw carried by the reset lever and disposed to engage the pin when the reset lever is moved to cause the idler roller to engage the feed rod, and a pair of extensible springs secured at the lower ends to the second connector block and at the upper ends to the support strap and extending therealong for retrieving the downwardly-movable members of the feeding mechanism after the trip ring has engaged the trip lever to release the reset lever and the idler roller from engagement with the feed rod.

JOHN H. BLANKENBUEHLER.
ALBERT C. HUNKELER.